US012095676B1

(12) United States Patent
Olatunji et al.

(10) Patent No.: US 12,095,676 B1
(45) Date of Patent: Sep. 17, 2024

(54) SYSTEMS AND METHODS FOR MANAGING RESOURCES ACROSS GLOBAL OR CLOUD NETWORKS

(71) Applicant: Citibank, N.A., New York, NY (US)

(72) Inventors: John Oladapo Olalowo Olatunji, London (GB); Diego Miyake Dos Santos, Tampa, FL (US); Rodolphe De Lassus Saint-Genies, New York, NY (US); Ryan Rhea Rugg, New York, NY (US); Sujay Nanjashetty, London (GB); Ambrish Bansal, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/592,244

(22) Filed: Feb. 29, 2024

(51) Int. Cl.
*H04L 9/40* (2022.01)
*H04L 47/70* (2022.01)

(52) U.S. Cl.
CPC .............. *H04L 47/822* (2013.01); *H04L 9/40* (2022.05); *H04L 47/827* (2013.01)

(58) Field of Classification Search
CPC ........ H04L 47/822; H04L 9/40; H04L 47/827
See application file for complete search history.

(56) References Cited

U.S. PATENT DOCUMENTS 10,621,164 B1 * 4/2020 Kain ..................... G06F 16/215
11,706,155 B1 * 7/2023 O'Connor ............. H04L 47/762
709/226

* cited by examiner

*Primary Examiner* — Minh Chau Nguyen
(74) *Attorney, Agent, or Firm* — Foley & Lardner LLP

(57) ABSTRACT

Systems and methods for managing resources across a global and/or cloud network. In particular, systems and methods for mitigating issues related to providing services while resources are off-line (or may potentially go off-line). For example, the systems and methods may mitigate issues related to providing services while resources are off-line (or may potentially go off-line) by monitoring network services at an aggregate level.

20 Claims, 5 Drawing Sheets

SYSTEMS AND METHODS FOR MANAGING RESOURCES ACROSS GLOBAL OR CLOUD NETWORKS

BACKGROUND

Cloud computing refers to the delivery of computing services over the internet (the cloud) to offer on-demand access to a variety of resources, including computing power, storage, databases, networking, and/or software, without direct management or control of the underlying infrastructure by the user. A key characteristic of cloud computing is that it allows for the quick and flexible scaling of resources up or down based on demand. To provide this rescaling, the devices in the cloud computing network must maintain connectivity to the network. If a device loses connectivity to the network, the device is no longer available for use as a network resource.

To mitigate disruptions resulting from the loss of one or more devices in the network, cloud providers often have redundant systems in place across multiple devices, data centers, and/or regions. If one device (or data center) experiences an outage, services can be rerouted to another device (or data center), ensuring continuity of service. This redundancy reduces the impact of random network outages.

However, rerouting services and redundancies have their limits. For example, while a given service may be rerouted if a data center assigned to that service goes off-line, the network still loses the resources of that data center (e.g., the aggregate number of services that can be performed by the network are reduced due to the loss of the data center). If the percentage of resources in a network that goes off-line is too high or the number of services otherwise required exceeds the available resources, the services must be triaged and/or services are suspended.

To further complicate this technical problem, if a resource goes off-line information about that resource is also inaccessible. For example, information about what services are, or were, being provided by the resource is no longer available. This not only effects services currently being performed (e.g., services that are suspended), but also prevents the network as a whole from obtaining information used to plan and/or route services in the future. For example, the network is no longer able to determine if the resource will have availability for performing future services (e.g., based on services currently being performed being completed, services not currently being scheduled to be performed in the future, and/or services likely to be completed while the resource is off-line).

SUMMARY

In view of the aforementioned technical problems, systems and methods are described herein for managing resources across a global and/or cloud network. In particular, systems and methods are described for mitigating issues related to providing services while resources are off-line (or may potentially go off-line). For example, the systems and methods may mitigate issues related to providing services while resources are off-line (or may potentially go off-line) by monitoring network services at an aggregate level. By doing so, the system may determine what resources, if any, will have availability for performing services (e.g., services currently being performed being completed, services not currently being scheduled, and/or services likely to be completed) irrespective of whether or not a resource is off-line.

However, monitoring network services at an aggregate level presents several technical issues. First, different services may require different resources that may be describe by different terminology and/or may generate usage data related to the different resources in different formats. Furthermore, the way an application uses a resource to perform a service, the availability required, and/or the attributes of that service may be specific to the application and/or resource. To overcome these technical issues, the system generates a tokenized representation of these respective availabilities, which standardizes and abstracts the underlying complexities of different formats and requirements. Using this tokenization, the system may monitor the network services at the aggregate level.

Unfortunately, tokenization alone does not overcome all the technical issues related to monitoring network services at the aggregate level. For example, to generate a proper tokenization of availability at a resource, the system needs to receive updated data related to each service and resource. However, if a resource is off-line, the updated data may not be available. As such, the system may determine a synthetic availability for any resource that is off-line to compliment an actual availability of any resource that is on-line. The system may then tokenize the synthetic availability and actual availability. The tokenization of these availabilities may then be used to monitor the network services at the aggregate level in real-time with the system replacing the tokens of the synthetic availability with actual availability (and vice-versa) as resource come on-line and go off-line.

However, the real-time monitoring of tokens based on synthetic availability and actual availability as well as replacing tokens based on synthetic availability and actual availability as devices comes on-line presents timing and organizational challenges. Furthermore, maintaining a log of the tokens and/or their respective basis (e.g., synthetic or actual availability) creates a fundamental technical flaw in that if the device (or data center) responsible for maintaining the log goes off-line, the entire system is threatened. To overcome this fundamental technical flaw, the system maintains the log through a series of self-executing programs across a decentralized blockchain network. For example, by using the decentralized blockchain network to maintain the log, the loss of any device (or data center) due to the device (or data center) going off-line will not threaten the system or impede its ability to monitoring network services at the aggregate level.

In some aspects, systems and methods for managing resources across global or cloud networks while mitigating issues related to providing services while resources are off-line. For example, the system may determine, a first self-executing program, a first actual availability for a first resource in a first network, wherein the first resource is currently on-line. The system may determine, a second self-executing program, a first synthetic availability for a second resource in the first network, wherein the second resource is currently off-line. The system may generate an aggregate availability for the first network based on the first synthetic availability and the first synthetic availability. The system may receive a first user request to perform a first blockchain action across the first network. The system may process the first user request by adjusting the aggregate availability based on the first blockchain action.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
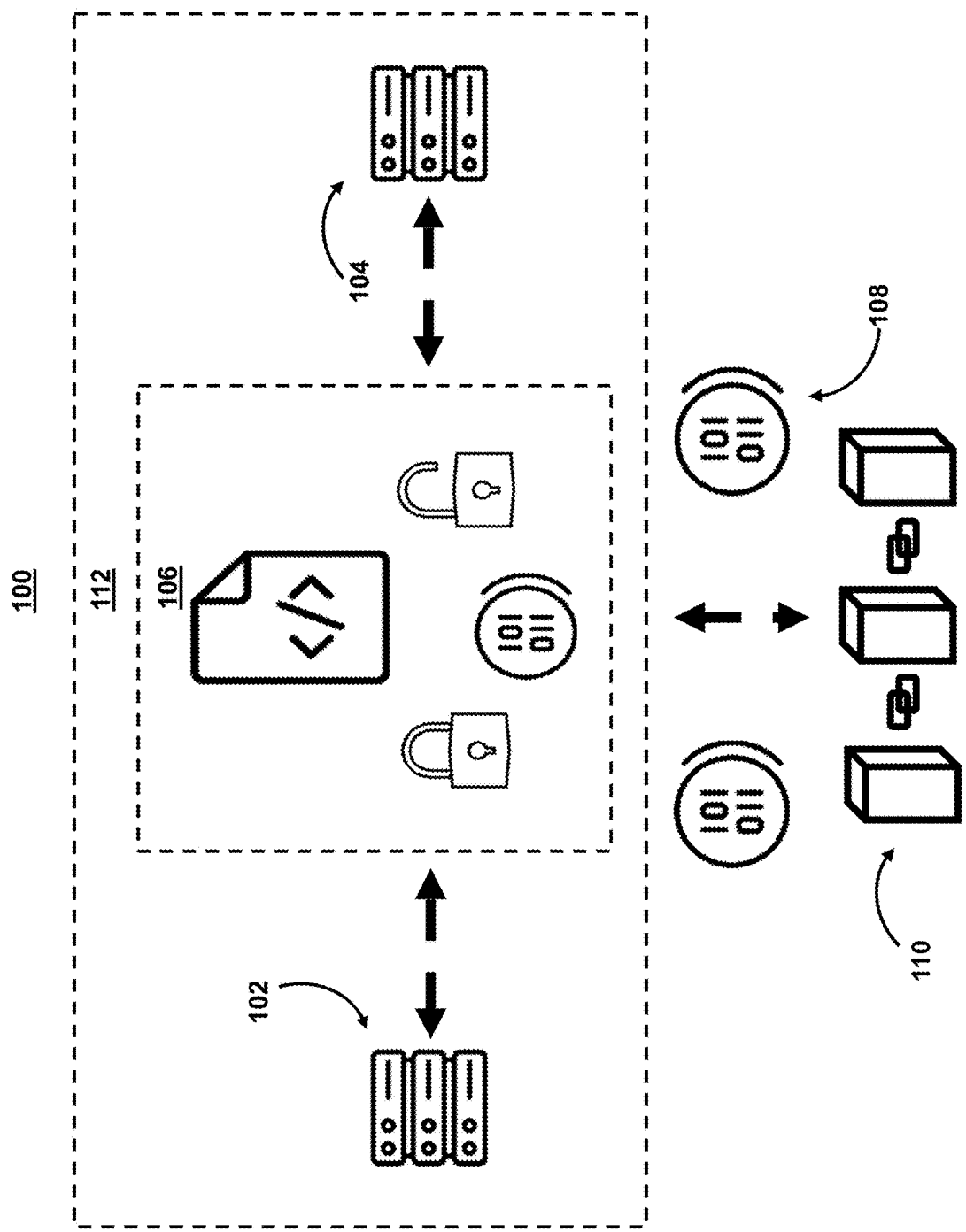
FIG. 1A shows an illustrative architecture for managing resources across global or cloud networks, in accordance with one or more embodiments.

FIG. 1A shows an illustrative architecture for managing resources across global or cloud networks, in accordance with one or more embodiments. For example, system 100 includes a network between two resources (e.g., resource 102 and resource 104). As described herein, a resource may refer to any entity or component within the network that is made available and accessible for use by network users, applications, or devices. These resources can be hardware devices, software applications, or data that are shared across the network for various purposes. Hardware devices may include physical devices connected to the network that can be shared among multiple users or applications. Examples of hardware resources in a network include printers, scanners, servers, routers, switches, storage devices (like NAS—Network Attached Storage), and other peripheral devices. Software resources may be software applications, programs, or services made available for access and utilization over the network. This could include shared databases, file servers, web servers, email servers, application servers, and any other software-based services accessible to network users. Data resources refer to information or data stored and shared within the network. This could include shared files, documents, databases, multimedia content, and any other data that can be accessed and utilized by authorized users or applications within the network. Network resources are typically made accessible through a process called resource sharing or resource sharing protocols, which allow authorized users or devices to access, use, or modify these resources based on permissions and security configurations set by the network administrators. For instance, in a client-server network model, a server could host resources such as files or applications, and client devices can request access to these resources over the network. Access control mechanisms, such as user authentication and permissions, regulate who can access specific resources and what actions they can perform on those resources.

In some embodiments, resources may encompass a wide array of assets, tools, and components that are essential for conducting operations, delivering services, managing finances, and supporting a financial service firm's overall functioning. For example, a resource may comprise financial assets. Financial assets include cash reserves, investments, securities, loans, and other financial instruments held by the firm or managed on behalf of clients. For example, a resource corresponding to a user may comprise a bank account for that user.

In some embodiments, a resource may comprise a bank branch or other subdivision of the firm and/or an amount of liquidity for the bank branch or subdivision. For example, when a resource is a bank branch or other subdivision, the resource may go on and/or off-line based on the operating hours (or regulated trading hours) for the bank branch or subdivision. For example, banks and financial institutions often have specific business hours during which their systems and staff are available to process transactions. Outside these hours, certain banking functions, including fund transfers, may not be processed immediately. Some financial regulations or rules may limit or dictate the processing of certain types of transactions or transfers after regular business hours for security, compliance, or fraud prevention purposes. Banks may also risk management measures in place to detect and prevent fraudulent activities. Transactions initiated after hours may be flagged for additional scrutiny to ensure they are legitimate, which could cause delays.

In some embodiments, system 100 may illustrate one or more communications between resource 102 and resource 104 as managed by a platform application. For example, a platform application may be used to facilitate one or more blockchain actions (e.g., via self-executing program 106) to conduct the communications across computer network 112.

As referred to herein, a computer network may refer to a collection of interconnected computers and other devices that are linked together to share resources, information, and services. These networks can be established using various technologies and configurations, allowing devices to communicate and exchange data with each other. In some embodiments, the computer network may comprise a network for a financial services firm.

In some embodiments, a computer network (or simply network) may refer to the interconnected system of computers, devices, and infrastructure specifically designed and configured to support the operations and services provided by a financial service firm and/or the financial industry. The network infrastructure may enable the firm to process transactions efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems.

In some embodiments, the computer network may comprise a global payment network that facilitate credit and debit card transactions. The network may connect issuing banks, acquiring banks, merchants, and cardholders, enabling electronic payments at point-of-sale terminals and online. In some embodiments, the computer network may comprise an ACH (Automated Clearing House). An ACH is a network used for electronic fund transfers and direct deposits in the United States. It enables the processing of large volumes of credit and debit transactions, including payroll deposits, bill payments, and person-to-person transfers. In some embodiments, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some embodiments, the computer network may comprise a blockchain network.

As described herein, a "platform application" may refer to software or an application that serves as a foundation or infrastructure for developing and deploying other software applications or services. It provides a set of tools, frameworks, and functionalities upon which developers can build, integrate, and run applications. These platforms form the basis for running other software applications. Examples include Windows, macOS, Linux, iOS, and Android. They provide the necessary environment and services for software to execute on devices like computers, smartphones, and tablets.

In some embodiments, the platform application may be used to manage the availability of devices in a computer network. This type of platform application is designed to monitor, control, and manage various devices and components within a network to ensure their availability, performance, and security. The platform application may automatically identify and map devices present on the network, including computers, routers, switches, servers, printers, and other network-connected devices. The platform application may constantly monitor the status and performance metrics (such as bandwidth usage, CPU usage, memory, etc.) of network devices to identify any abnormalities or performance bottlenecks. The platform application may generate alerts or notifications when certain predefined thresholds are breached or when anomalies in network behavior are detected. This helps in proactive issue resolution and prevents network downtime. The platform application may allow administrators to centrally manage and update device configurations, ensuring consistency and compliance with network policies and standards. The platform application may monitor the network for security threats, unauthorized access attempts, malware, and other vulnerabilities, providing insights into potential security breaches.

In some embodiments, the platform application may comprise a platform application for a financial services firm. A platform application, in the context of a financial services firm or a global bank, typically refers to a software application or system that serves as a foundation or framework for delivering various financial services, managing transactions, facilitating communication, and supporting interactions between different entities within the firm or with external stakeholders such as clients, partners, or regulatory bodies. These platform applications may be designed to integrate multiple functionalities and services within a unified infrastructure. These functionalities and services may encompass various aspects such as banking operations (e.g., day-to-day banking operations including customer onboarding, account management, transaction processing, and compliance), trading (e.g., trading functionalities for various financial instruments like stocks, bonds, derivatives, and currencies), risk management (e.g., risk assessment and management tools to monitor and mitigate risks across different financial activities), Customer Relationship Management (CRM) (e.g., functionalities that manage client interactions, track customer preferences, and personalize services), data analytics and reporting (e.g., capabilities that derive insights from large volumes of financial data), compliance and regulatory requirements (e.g., features to ensure compliance with various financial regulations and standards), mobile and online banking (e.g., mobile applications and online banking portals).

In some embodiments, the system receives the first request may comprise receiving, at a platform management application, a user request to perform a first off-chain action. The system may then determine that the first blockchain action corresponds to first off-chain action. For example, a user may initiate a request for a specific action that needs to be performed off-chain. This request could come through a user interface, API call, or any other user interaction method supported by the platform. The user request is received by the system and routed to a platform management application that serves as the central control or coordination point for managing various actions within the system. The platform management application analyzes the received user request and identifies the nature of the action requested. It parses and understands the details of the requested off-chain action, such as its purpose, parameters, and requirements. The system, through its logic or predefined mapping rules, identifies that the requested off-chain action has a corresponding action or operation that needs to be executed on the blockchain. This mapping could be based on predetermined correlations between off-chain and on-chain actions within the system's architecture or business logic.

The platform management application may validate the user request, ensuring it meets necessary criteria, security checks, and any required authorizations before proceeding further. Upon recognizing the corresponding blockchain action linked to the off-chain request, the system prepares the necessary data, parameters, or transaction details (e.g., other resources involved in the blockchain action) required to execute the corresponding action on the blockchain. For example, the system may receive a first user request to perform a first off-chain action determining that the first blockchain action corresponds to a second resource (e.g., a transaction from a first resource to a second resource).

Using appropriate mechanisms or interfaces (e.g., one or more self-executing programs, APIs, etc.), the platform management application triggers the execution of the determined blockchain action that aligns with the requested off-chain action. The prepared blockchain action is broadcasted to the blockchain network, initiating the process of validating, processing, and confirming the action by network nodes or validators. Validators in the blockchain network process the transaction, execute the action according to the defined logic, and include the validated transaction in a block. Once confirmed and added to the blockchain, the action is considered completed on-chain. The platform management application updates the status of the user request, providing feedback or notifications to the user about the successful execution of the requested action, whether it is off-chain or on-chain.

System 100 (e.g., using a platform application) may facilitate the performance of an off-chain action. As described herein, an "off-chain action" may refer to any activity or transaction that occurs outside the underlying blockchain network or protocol. Off-chain actions can take various forms, including off-chain transactions. These are transactions that occur outside the main blockchain network. They are conducted through secondary layers or channels and are settled or reconciled on-chain later. This helps in reducing congestion on the main chain and lowering transaction fees. Off-chain actions may also comprise off-chain computations. For example, complex computations or operations that are computationally expensive can be performed off-chain. For instance, in decentralized applications (DApps), certain computations or processes might be handled off-chain to improve performance and reduce latency, with only the final outcome or necessary data being recorded on the blockchain.

In some embodiments, off-chain actions may also comprise state channels and/or sidechains. For example, these are off-chain scaling solutions that enable parties to conduct transactions or execute smart contracts off the main chain. State channels allow participants to interact directly with each other off-chain, updating the state between them, while sidechains are separate blockchains that can be connected to the main blockchain, facilitating faster and more scalable transactions.

In some embodiments, off-chain actions may also comprise off-chain data storage. For example, storing large amounts of data directly on a blockchain can be inefficient and costly. Off-chain data storage solutions, such as decentralized storage networks (e.g., IPFS, Filecoin), enable the storage of data off-chain while maintaining references or proofs of the data's existence or integrity on the blockchain.

In some embodiments, an off-chain action (or result thereof) may refer to any data, information, or transactional details that are stored, processed, or maintained outside of the primary blockchain network. In blockchain technology, off-chain records exist separately from the main distributed ledger or blockchain itself. For example, an off-chain record may comprise a user bank account and/or other account linked to a user and/or other entity.

To facilitate the off-chain action, system 100 may use one or more on-chain actions related to network 110. Network 110 may comprise a blockchain. As described herein, a blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the Internet, etc.). The blockchain stores information electronically, grouped together into a series of subsets of the information, called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

For example, network 110 may comprise a digital log. A digital log may comprise a record or file that captures and stores a chronological sequence of events, actions, or transactions in a digital format. These logs serve various purposes across different domains, including information technology, cybersecurity, finance, and more. Digital logs may maintain a time-sequenced record of activities, events, or changes. Each entry in the log file typically includes a timestamp indicating when the event occurred. The digital log may contain specific details about the events or actions being logged. This information could include user activities, system events, errors, security-related events, transactions, or changes in configurations. Digital logs can be stored in various formats, including text files, structured databases, JSON, XML, or other formats that suit the specific requirements of the system or application generating the logs. The digital logs may be used for diagnosing issues, troubleshooting problems, monitoring system performance, conducting forensic analysis, and auditing activities. They serve as a historical record for understanding past actions or incidents.

In some embodiments, the digital log may comprise a distributed ledger (e.g., for a blockchain) and/or other index of blockchain data. For example, the distributed ledger may be a type of database or digital ledger that exists across multiple locations or nodes within a decentralized network. It records transactions, contracts, or any form of data in a secure, transparent, and tamper-evident manner without the need for a central authority or intermediary. Unlike traditional centralized ledgers, distributed ledgers are not controlled by a single entity. Instead, they are distributed among multiple participants or nodes in a network, each maintaining an identical copy of the ledger. This decentralization increases transparency and resiliency by eliminating a single point of control or failure. Distributed Ledgers use consensus mechanisms among network participants to validate and agree upon the state of the ledger. Consensus protocols ensure that all copies of the ledger across the network are in sync and agree on the validity of transactions, maintaining a consistent record of data. Once information is added to the ledger, it becomes virtually immutable, meaning it cannot be altered or deleted retroactively without consensus from the network. The use of cryptographic techniques ensures the security and integrity of the data stored on the ledger.

Network 110 may be used by system 100 to manage and/or facilitate one or more cryptographically secure digital assets (e.g., asset 108). A cryptographically secure digital asset may comprise a tokenization of a value or asset (e.g., a tokenized bank deposit). For example, a cryptographically secure digital asset refers to a digital representation of value, ownership, and/or rights that is secured by cryptographic techniques, ensuring its integrity, authenticity, and/or protection against unauthorized access or modification. These assets exist in digital form and rely on cryptographic protocols and technologies for their security and verification. For example, the asset's security may be based on cryptographic algorithms and techniques that provide strong encryption, hashing, digital signatures, and other cryptographic mechanisms to protect its data and transactions. The cryptographically secure digital assets may operate on blockchain networks. Blockchains use decentralized and distributed ledger technology, ensuring tamper-proof records of transactions and asset ownership. Transactions involving these assets are recorded on a blockchain, creating an immutable and transparent history of ownership and transactional history. Once recorded, data on the blockchain cannot be altered retroactively without consensus from the network. Cryptographically secure digital assets allow ownership and transfer of value or rights in a decentralized manner. Users can securely transfer ownership or conduct transactions directly without relying on intermediaries. Users may access and manage these assets using cryptographic keys. Public and private keys allow users to securely interact with the assets, sign transactions, and prove ownership without revealing sensitive information.

Network 110 may be used to facilitate communications (e.g., blockchain actions) irrespective of whether a resource is on-line. For example, a resource in a network may be "online," whether it is a device, service, and/or application, when it is currently connected and available for communication and interaction within the network. In contrast, a resource may be off-line when it is not on-line. For example, the term "online" signifies that the resource is active, operational, and accessible to other devices or users in the network. Being online implies that the resource is powered on, connected to the network infrastructure (such as the internet or a local network), and ready to send, receive, or process data, requests, or commands.

For example, a computer, server, printer, or any network-connected device is considered online when it is powered up, connected to the network (via Ethernet or Wi-Fi), and ready to send and receive data. In another example, applications, websites, or cloud-based services may be online when their servers are operational, connected to the internet, and available for users to access or utilize their functionalities. In yet another example, being online indicates that the resource is reachable and responsive to requests or communication attempts from other devices or users on the network. For example, in embodiments, in which the resource is a bank account, bank branch, etc. the resource may be on-line when the resource (or assets held by the resource) are reachable and responsive to requests or communication attempts from other devices or users on the network.

In some embodiments, system 100 may be used to manage resources across network 110. For example, system 100 may manage resources based on the availability of resources in network 110. In some embodiments, availability may comprise resource availability. Resource availability in a computer network may refer to the accessibility and readiness of various network resources, devices, services, or applications for use by authorized users or other components within the network. It signifies the ability of these resources to fulfill requests, process data, or perform tasks effectively and efficiently when required. For example, availability may correspond to device accessibility (e.g., the ability of devices (such as computers, servers, routers, switches, printers, etc.) to be reachable and responsive on the network), service uptime (e.g., time services remain operational and responsive to user requests), bandwidth and performance (e.g., resources promptly accessing and/or delivering data or services efficiently without delays or bottlenecks), data and information access (e.g., availability of data resources, databases, files, and information required by users or applications within the network).

In some embodiments, availability may correspond to liquidity. Liquidity refers to the ability of a bank or financial institution to meet its short-term obligations and fund its day-to-day operations efficiently. It represents the availability of liquid assets that can be quickly converted into cash to cover liabilities, withdrawals, or unexpected demands for funds. Banks maintain liquidity primarily through liquid assets such as cash, reserves held at central banks, short-term government securities, highly marketable securities, and other instruments that can be easily sold or converted into cash without significant loss of value. Banks may engage in asset-liability management to balance their assets and liabilities, ensuring that they have sufficient liquid assets to cover liabilities and maintain a healthy liquidity position.

In some embodiments, the system may determine one or more characteristics of availability in one or more resources. The system may then select a cryptographically secure digital asset, from a plurality of cryptographically secure digital assets, based on the characteristics. In some embodiments, the system may determine one or more characteristics of availability in one or more resources. The system may then select a cryptographically secure digital asset, from a plurality of cryptographically secure digital assets, based on the characteristics. For example, the system (or self-executing program) may determine a condition for performing the first blockchain action and select a first cryptographically secure digital asset, from a plurality of cryptographically secure digital assets, based on the condition. For example, the condition may indicate a requirement for a cryptographically secure digital asset as recorded in a predetermined digital log corresponding to the first resource. For example, the self-executing program condition may determine a requirement for a first cryptographically secure digital asset, as recorded in a predetermined digital log corresponding to a resource, involves encoding specific criteria or rules within the smart contract's code to validate the possession or existence of the digital asset before executing certain actions or operations. For example, developers encode conditions within the self-executing program's code using a programming language suitable for smart contracts (e.g., Solidity for Ethereum). These conditions define the rules or requirements that need to be met regarding the possession or existence of the cryptographically secure digital asset. The self-executing program may interact with a predetermined digital log or ledger that records information related to resources. The condition within the contract checks this log to verify the presence or ownership of the specific digital asset corresponding to the resource. The condition may specify requirements such as verifying the ownership of the digital asset through cryptographic keys, checking the asset's unique identifier or token ID, validating a specific transaction or event recorded in the digital log related to the asset, or confirming its existence in a specific state. When a user initiates an action or transaction involving the resource within the self-executing program, the condition is evaluated. If the condition verifies the possession or existence of the required cryptographically secure digital asset in the predetermined digital log, the self-executing program proceeds with the intended operation or execution.

As described herein, a characteristic of availability may comprise any attribute that distinguishes the availability (or availability on a resource) from other availability (or availability on another resource). In some embodiments, characteristics of availability in resources within a computer network may refer to attributes or factors that define the accessibility, reliability, and continuity of these resources. For example, a characteristic may refer to uptime and reliability as availability is associated with the ability of resources to remain operational and accessible over time without unexpected interruptions. High availability implies minimal downtime and consistent reliability.

In another example, a characteristic may refer to accessibility. Available resources should be easily accessible and reachable by users or systems when needed. This includes factors such as network connectivity, response time, and the absence of barriers preventing access. In another example, a characteristic may refer to redundancy and fault tolerance. Systems designed with redundancy have backup mechanisms or duplicate resources to ensure continuous operation even if one component fails. Fault-tolerant systems can detect and recover from failures without significant impact on availability. In another example, a characteristic may refer to resilience to failures. Availability may be linked to a system's resilience against failures caused by hardware malfunctions, software errors, network issues, or other disruptions. Systems designed for high availability can withstand failures and maintain functionality. In another example, a characteristic may refer to scalability and capacity planning. Availability considerations involve the ability to scale resources to meet increasing demand without compromising performance or accessibility. Proper capacity planning ensures resources are available as needed. In another example, a characteristic may refer to monitoring and maintenance. Continuous monitoring, proactive maintenance, and timely interventions play a crucial role in ensuring resource availability. Monitoring tools help detect issues early, allowing for prompt resolution and minimizing downtime. In another example, a characteristic may refer to recovery and disaster preparedness. Availability includes having recovery strategies and disaster preparedness plans in place. These plans help restore services quickly after unexpected events, such as natural disasters or cyber-attacks. In another example, a characteristic may refer to service level agreements (SLAs) characteristics. Defining and adhering to SLAs regarding availability metrics, such as uptime percentage, response time, and maintenance windows, is essential in ensuring commitments to users or customers.

In another example, a characteristic may refer to geographical distribution and load balancing. Distribution of resources across multiple geographical locations and load balancing techniques contribute to availability by ensuring even distribution of workload and minimizing the impact of localized disruptions. In another example, a characteristic may refer to security measures. Availability is linked to security practices that protect resources from unauthorized access, cyber threats, or malicious attacks. Security measures prevent service disruptions caused by security breaches. In another example, a characteristic may refer to documentation and recovery procedures. Maintaining comprehensive documentation and well-defined recovery procedures helps restore services efficiently in case of outages or failures, minimizing the impact on availability.

In some embodiments, a characteristic of availability may refer to a characteristic of a good, service, and/or medium of exchange (e.g., money). The characteristics of currency, which is issued by governments and central banks. For example, a characteristic may refer to an issuing authority (e.g., a recognized government or central monetary authority within a country), legal tender (e.g., whether it is authorized by the government for settling debts, transactions, and payments within the country's borders), denomination and/or amount, physical form (e.g., banknotes and coins), type (e.g., fiat, commodity-backed), security features, exchange rate, stability, regulation, etc.

Selecting a cryptographically secure digital asset from a plurality of such assets based on characteristics involves a process that considers various attributes or features associated with these assets. The system may identify the specific characteristics or attributes that are essential for the system's purpose or requirements. These criteria could include factors such as security features, transaction speed, scalability, decentralization, consensus mechanism, token standard (e.g., ERC-20, ERC-721), utility, or network adoption. The system may obtain information and data about the plurality of cryptographically secure digital assets under consideration. This information may include technical specifications, whitepapers, historical performance, market data, developer community, security audits, and use case relevance. The system may evaluate and compare the characteristics of each digital asset against the predefined selection criteria. Assess how well each asset aligns with the system's requirements, considering factors like security, functionality, transaction costs, liquidity, governance, or regulatory compliance. The system may apply a weighted scoring system or ranking mechanism to assign importance or priority to different characteristics based on their relevance to the system's goals. For example, security might have higher weightage compared to transaction speed. The system may conduct both quantitative analysis (e.g., metrics, performance data) and qualitative analysis (e.g., community support, development activity) to comprehensively assess the assets' characteristics. In some embodiments, the system may employ decision models or algorithms that factor in the weighted criteria and analysis to generate a scoring system or rank the assets based on their suitability for the system's requirements.

Figure 1B:
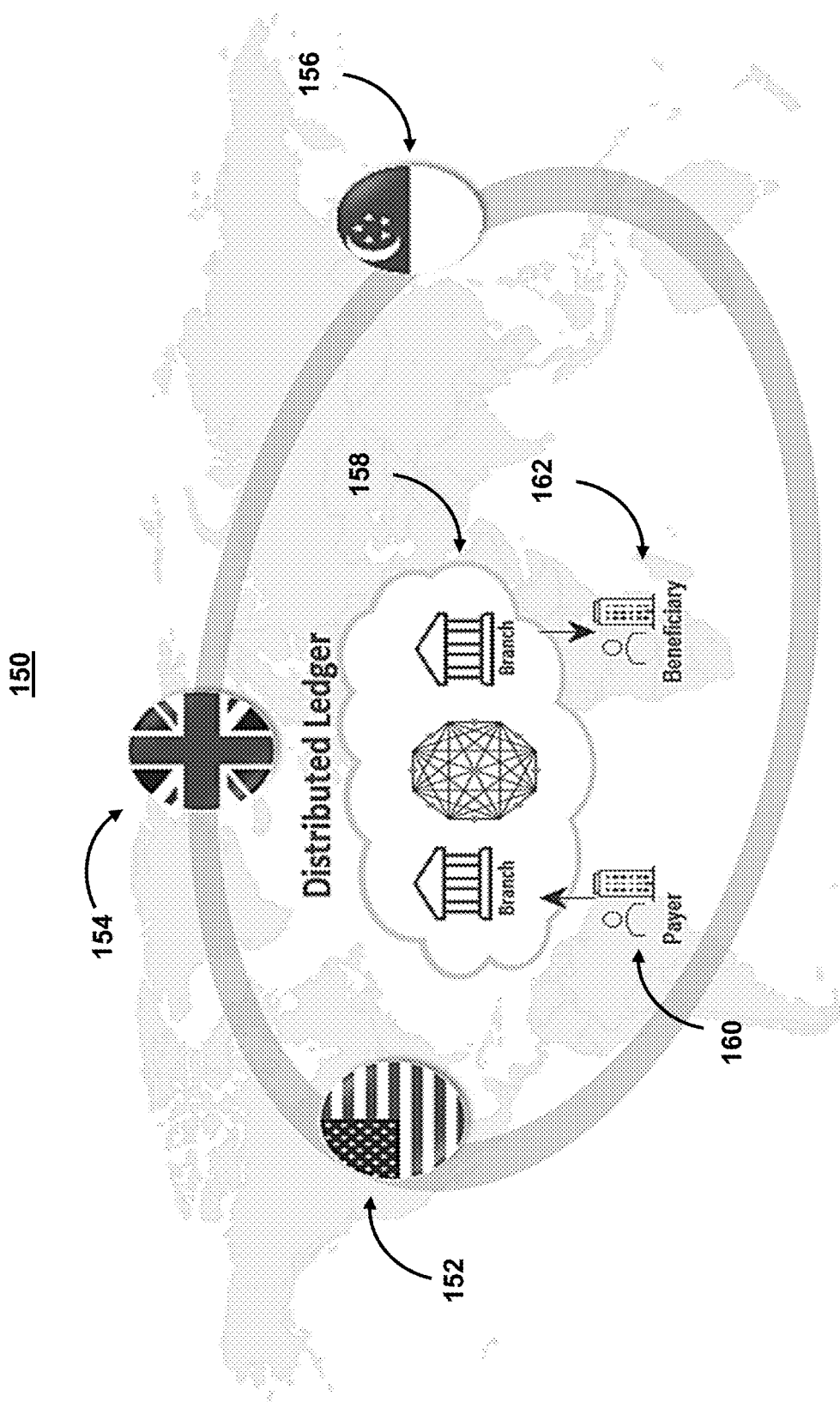
FIG. 1B shows an illustrative diagram for managing resources across global or cloud networks, in accordance with one or more embodiments.

FIG. 1B shows an illustrative diagram for managing resources across global or cloud networks, in accordance with one or more embodiments. For example, as shown in FIG. 1B, system 150 may for managing resources across global or cloud networks while mitigating issues related to providing services while resources are off-line. System 150 may use the architecture described in FIG. 1A (e.g., system 100) to manage these resources. For example, system 150 may reflect that application of system 100 (FIG. 1A) to the exchange of money, assets, and/or financial instruments between parties located in different countries or jurisdictions. These transactions involve the movement of funds or financial instruments across international borders and are conducted through various channels within the global financial system. International transactions can be complicated by the closure of local bank branches due regulatory issues related to conducting transactions after hours (e.g., when a bank branch is off-line). This could delay the processing of transactions or create difficulties in meeting regulatory requirements. System 150 (e.g., via system 100 (FIG. 1A)) may overcome these difficulties using a series of networks.

For example, system 150 may illustrate a transaction occurring from a bank branch (or account) located in jurisdiction 152 and jurisdiction 156, which may also involve jurisdiction 154. In particular, system 150 may illustrate how the availability of liquidity is used to conduct international transactions. For example, banks use liquidity as a crucial factor in facilitating international transactions. Liquidity, in the context of banking, refers to the availability of funds or assets that a bank holds to meet its financial obligations, including processing transactions. Banks use their liquidity to provide funding for international transactions, including trade finance, cross-border payments, letters of credit, and other financial services required by businesses or individuals engaged in global trade. Banks use liquidity to settle cross-border payments on behalf of their customers. Adequate liquidity enables banks to convert and transfer currencies, ensuring timely and smooth international payments between parties in different countries.

For example, the system may determine, using one or more self-executing programs, a first actual availability (e.g., liquidity) for a first resource (e.g., a first user account and/or bank branch) in a first computer network (e.g., financial services network), wherein the first resource is currently on-line (e.g., the branch is currently open), and wherein the first actual availability is represented by a first cryptographically secure digital asset in a digital log (e.g., digital log 158).

In some embodiments, the system may determine a synthetic liquidity for a resource that is off-line. Synthetic availability (e.g., liquidity) may refer to availability (e.g., liquidity) that is artificially created or enhanced through instruments, strategies, mechanisms, and/or the use of tokenized digital assets. For example, rather than relying solely on traditional liquid assets or actually determined availability, the system may use synthetic availability as a placeholder.

The system may determine, using the one or more self-executing programs, a first synthetic availability (e.g., liquidity) for a second resource (e.g., a second user account and/or bank branch) in the first computer network, wherein the second resource is currently off-line (e.g., the bank branch is closed), and wherein the first synthetic availability is represented by a second cryptographically secure digital asset in the digital log.

The system may determine a first aggregate availability (e.g., a global liquidity for the financial services firm) in the digital log for the first computer network based on the first cryptographically secure digital asset and the second cryptographically secure digital asset. The aggregate availability of resources in a computer network may refer to the collective or overall availability of various resources, devices, services, or applications within the network. It represents the combined availability status of multiple individual resources, considering their availability, readiness, and operational status as a whole. To determine the aggregate availability, the system may consider the availability of all network resources as a whole, including devices (such as servers, routers, switches, etc.), services (such as web servers, databases, email servers), applications, and other critical components within the network. Aggregate availability may provide a comprehensive view of the network's health by assessing the combined readiness and accessibility of multiple resources. It may take into account the interdependencies among various resources and their impact on the network's overall functionality.

In some embodiments, the aggregate availability may correspond to aggregate liquidity. Aggregate liquidity may refer to the overall or combined level of liquidity available to meet a bank or other entities funding needs and obligations across its various assets, liabilities, and off-balance-sheet exposures. It represents the collective liquidity position of the entity, considering all its sources of liquidity and the ability to withstand liquidity stress or funding challenges. It considers the total availability of liquid assets, funding sources, and contingent funding facilities that the bank can access to meet its short-term and long-term liquidity requirements.

The system may receive a first request (e.g., a request from a platform application to facilitate an action from payer 160 to beneficiary 162) to perform a first blockchain action, wherein the first blockchain action requests access to the second resource. A request (e.g., a computer request) may refer to a communication or a query made by a computer or a software application to another computer, server, and/or device on a network. This request is typically initiated by a client computer seeking specific information, data, resources, or services from a server or another computing device. Computer requests can take various forms depending on the nature of the interaction and the protocols used. For example, in web-based applications, computers often make HTTP (Hypertext Transfer Protocol) requests to web servers. These requests are sent when a user accesses a website, submits a form, or requests data from an API (Application Programming Interface). In another example, computers within a network communicate by sending requests and receiving responses. This could include file transfer requests, database queries, or any form of data exchange between devices on the network. Software applications often interact with external services or APIs to fetch or send data. API requests are made by the client application to the server hosting the API, specifying the desired action or information needed. In distributed computing environments, Remote Procedure Calls (RPCs) are requests made by one program to execute a procedure or function on another remote system, and then receiving the result. When a computer needs to resolve a domain name into an IP address, it sends a Domain Name System (DNS) request to a DNS server, asking for the IP address associated with a specific domain name.

The system may process the first blockchain action using the first aggregate availability. The system may process the first blockchain action using the first aggregate availability. For example, the system may use a privately permissioned blockchain network to enable real-time settlement between bank branches irrespective of whether branches are on-line. The system may process the blockchain action using the aggregate availability (or liquidity). For example, the system may process a blockchain action using aggregate liquidity involves leveraging the available liquidity resources within a blockchain network to facilitate transactions, ensure sufficient funds to fulfill obligations, and manage liquidity requirements effectively. For example, the system may aggregate liquidity within a blockchain network by combining availability of liquid assets, tokens, or cryptocurrencies held by participants, decentralized finance (DeFi) protocols, liquidity pools, and/or self-executing programs within the blockchain ecosystem. When a user initiates a transaction on the blockchain network (such as transferring tokens or executing a smart contract), the system assesses the liquidity requirements for that action. The system checks the aggregate liquidity available within the network. It may involve querying decentralized exchanges (DEXs), liquidity pools, or smart contracts to determine the availability of required tokens or assets. In some embodiments, liquidity may be pooled into account pools, device (or regional) pools, and/or decentralized liquidity pools. The system may then utilize these pools to source tokens or assets required for the transaction, ensuring sufficient liquidity to execute the action despite one or more resources being on or off-line.

The system may determine a second aggregate availability for the first computer network following the first blockchain action. In some embodiments, the system may balance the digital log (or other ledger) to reflect the actual availability (or liquidity) of a resource. For example, balancing a ledger of resource availability after using availability for a resource to conduct an action for another involves maintaining accurate records of resource availability transactions to ensure that the ledger reflects the changes made due to these actions. This process can be applied in various contexts, including accounting, resource management, or transactional systems within a computer network.

For example, the ledger may start with a record of the initial availability of resources (e.g., whether recorded as actual or synthetic availability). This could include details such as quantities, types, or states of available resources within the system or network. When a resource is used to conduct an action for another resource or entity, the system records this transaction in the ledger. It deducts or adjusts the availability of the utilized resource accordingly. The action is executed or performed using the utilized resource, fulfilling the intended purpose or transaction. This could involve processes like transferring resources, completing a task, providing a service, or facilitating a transaction. The system updates the ledger to reflect the utilization of the resource for the conducted action. It records the details of the transaction, including the specific resource utilized, the action conducted, quantities involved, timestamps, and any relevant metadata. After the action is completed and the ledger is updated, the system ensures that the total availability of resources is accurately reflected in the ledger. It reconciles the ledger entries to confirm that the total resources available match the sum of initial availability minus the utilized resources for conducted actions. The system verifies the ledger entries to ensure accuracy and consistency. It reconciles any discrepancies, verifies the integrity of the recorded transactions, and performs audits if necessary to confirm the correctness of resource availability records. The system continuously maintains and updates the ledger as resource transactions occur. It monitors resource utilization, updates availability records for each action, and ensures the ledger accurately represents the current availability of resources within the system or network.

The system may determine, using the one or more self-executing programs, a second synthetic availability for the second resource following the first blockchain action. The system may determine that the second resource is now on-line. The system may then replace, using the one or more self-executing programs, the second synthetic availability with second actual availability in the digital log. For example, replacing synthetic availability represented by digital assets with actual availability represented by detected availability in a digital log involves transitioning from a theoretical or assumed state of availability (synthetic availability) to the real-time, observed, or measured state of availability (actual availability) of resources or assets within a system. To do so, the system may establish metrics and parameters that determine synthetic availability based on digital assets or assumptions. For instance, synthetic availability might be calculated based on planned uptime, theoretical performance, or assumed availability of resources. The system may deploy monitoring systems, sensors, or tools within the network infrastructure to continuously observe and detect the actual availability of resources. These monitoring systems can track various aspects such as device uptime, response times, network connectivity, service status, etc. The system may continuously collect real-time data and performance metrics from the monitoring systems. This data provides insights into the actual operational status and availability of resources within the network. The system may compare the synthetic availability, which is derived from digital assets or assumptions, with the actual availability detected and recorded by the monitoring systems. The system may identify discrepancies or differences between the two states (e.g., as resource go on and off-line). The system may replace or update entries in the digital log that represent synthetic availability with the actual availability detected by the monitoring systems. The system may record the observed availability, downtime, incidents, or performance metrics accurately in the log entries. The system may implement automated reporting or alerting mechanisms that trigger notifications or reports whenever the detected availability deviates significantly from the synthetic availability or predefined thresholds.

Figure 2:
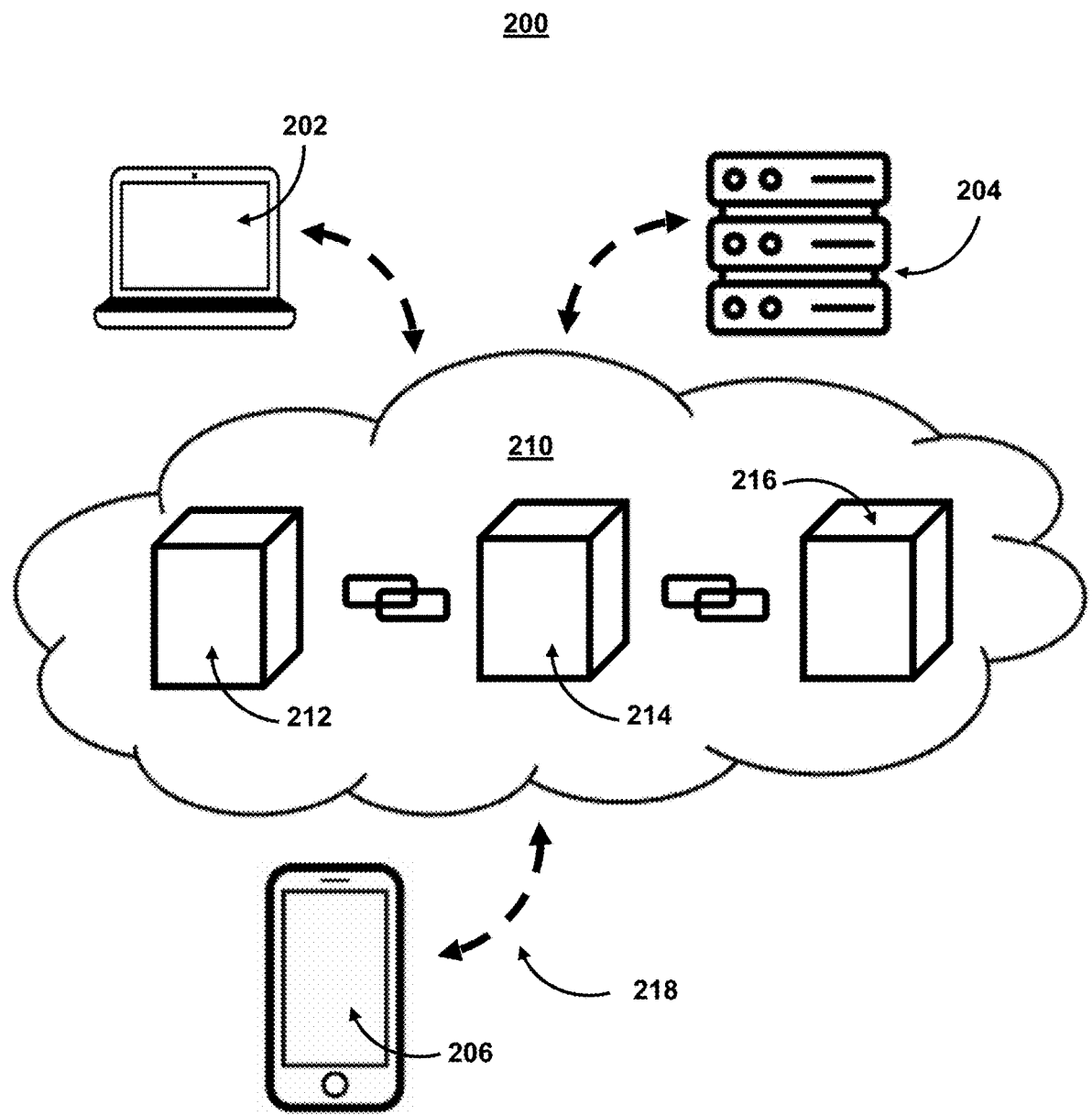
FIG. 2 shows an illustrative diagram of a blockchain network, in accordance with one or more embodiments.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more client, which behaves like an actual computer) for the system. The data structure may comprise one or more devices and/or components, which may act in concert to facilitate blockchain 210.

As referred to herein, blockchain 210 may comprise a type of distributed ledger technology that consists of growing list of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain network 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to managing resources across global or cloud networks using a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes network 218, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
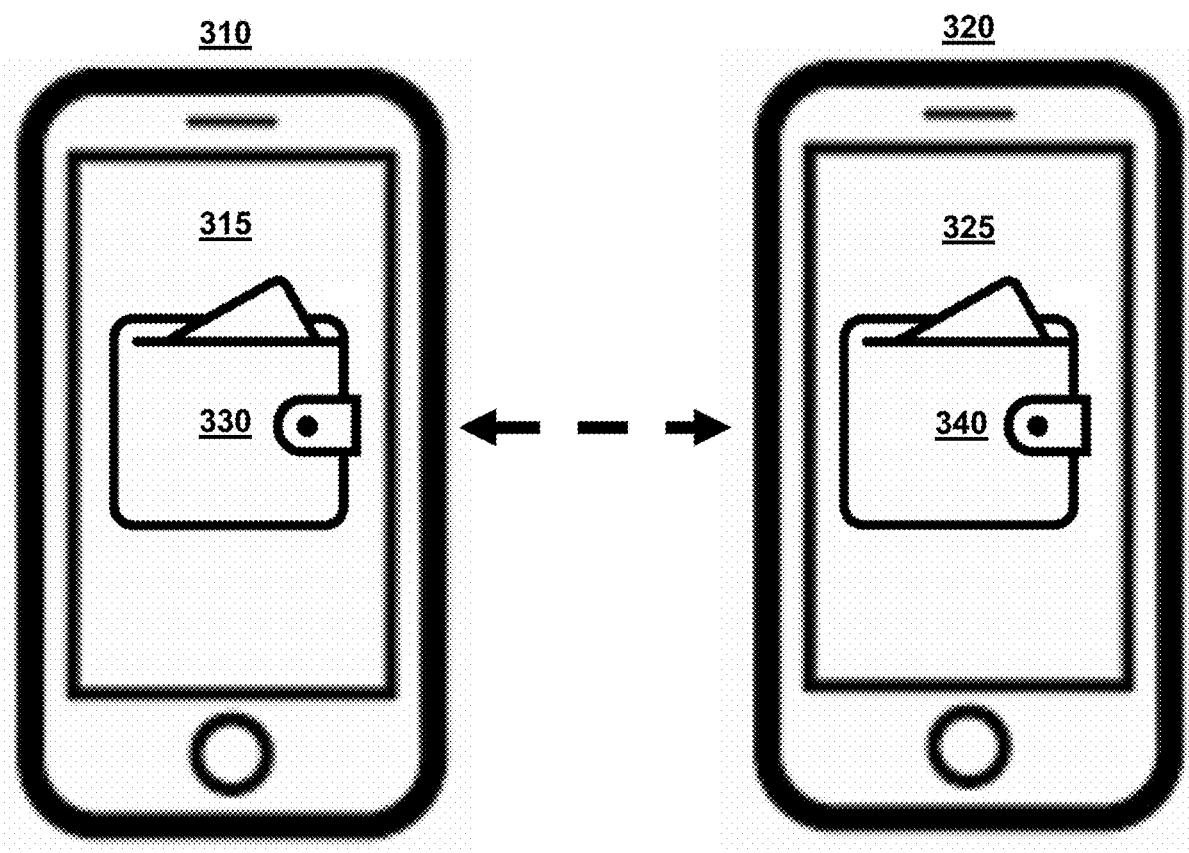
FIG. 3 shows an illustrative diagram for performing a blockchain action, in accordance with one or more embodiments.

FIG. 3 shows an illustrative diagram for conducting blockchain actions, in accordance with one or more embodiments. For example, the diagram presents various components that may be used to manage resources across global or cloud networks in some embodiments.

As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible tokens, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a smart contract may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325. As referred to herein, a "user interface" may comprise a mechanism for human-computer interaction and communication in a device and may include display screens, keyboards, a mouse, and the appearance of a desktop. For example, a user interface may comprise a way for a user interact with and/or access an application, website, and/or other program in order to manage resources across global or cloud networks. A user interface may display content related to blockchain actions. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

In some embodiments, blockchain actions may also comprise actions related to a self-executing program (e.g., a smart contract). As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more application program interfaces (e.g., APIs). For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate blockchain actions. For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to ten minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standard for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower-level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and assets, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based, storage application may correspond to a key-based wallet or a smart contract wallet. For example, a key based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain actions. In some embodiment, a cryptography-based, storage application may include, or have access to, key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 310, user interface 315, and/or cryptography-based, storage application 330) may comprise, control, and/or have access to a private key and/or digital signature. For example, system 300 may use cryptographic systems for conducting blockchain actions such as managing the availability of resources. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of tokens in order for system 300 to recognize it as a validator in the blockchain network.

In response to validation of the block, the block is added to a blockchain (e.g., blockchain 210 (FIG. 2)), and the blockchain action is completed. For example, to add the blockchain action to blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allows blockchain actions to be conducted between the user devices, without the need of any intermediaries or central authorities.

Figure 4:
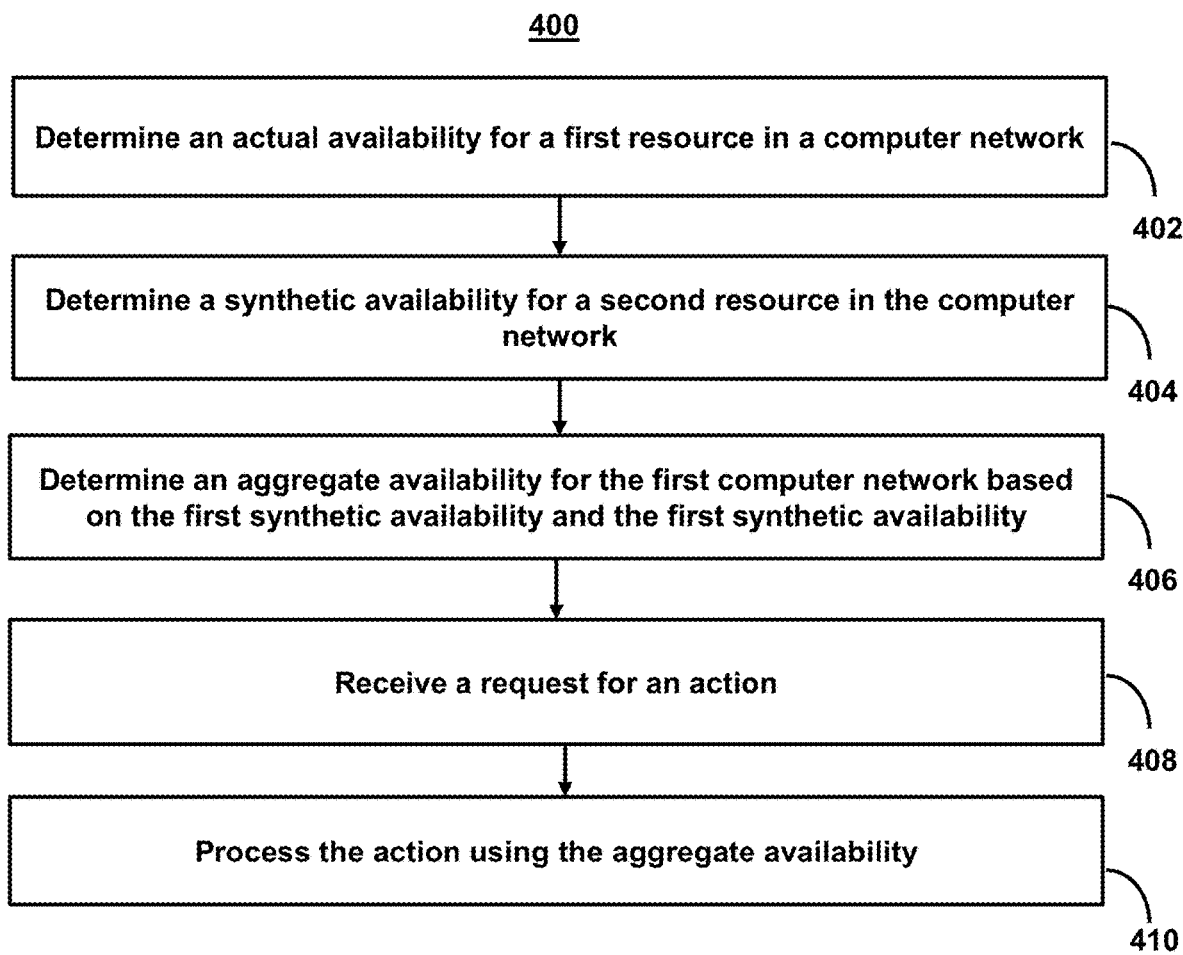
FIG. 4 shows a flowchart of the steps involved in managing resources across global or cloud networks, in accordance with one or more embodiments.

FIG. 4 shows a flowchart of the steps involved in managing resources across global or cloud networks, in accordance with one or more embodiments. For example, the system may use process 400 (e.g., as implemented on one or more system components described above) in order to manage resources across global or cloud networks while mitigating issues related to providing services while resources are off-line.

At step 402, process 400 (e.g., using one or more components described above) determine an actual availability for a first resource in a computer network. For example, the system may determine, using a first self-executing program, a first actual availability for a first resource in a first computer network, wherein the first resource is currently on-line, and wherein the first actual availability is represented by a first cryptographically secure digital asset in a digital log.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

At step 404, process 400 (e.g., using one or more components described above) determine a synthetic availability for a second resource in the computer network. For example, the system may determine, using a second self-executing program, a first synthetic availability for a second resource in the first computer network, wherein the second resource is currently off-line, and wherein the first synthetic availability is represented by a second cryptographically secure digital asset in a digital log.

In some embodiments, determining the first synthetic availability for the second resource in the first computer network may comprise the system retrieving a last known actual availability for the second resource from the digital log and selecting the first synthetic availability from a plurality of synthetic availabilities, based on the last known actual availability. For example, the system may access the digital log, which records historical actual availability data for the resource in the computer network. The system may retrieve the most recent or last known actual availability value recorded in the log. The system may use multiple synthetic availability models or algorithms exist to forecast or estimate availability based on different factors, such as historical patterns, statistical analysis, predictive models, or machine learning algorithms. These models may generate synthetic availability values that represent predicted or simulated availability for the resource. The system may employ a selection process that compares the last known actual availability retrieved from the digital log with the various synthetic availability values generated by different models. The comparison may involve evaluating the deviation or similarity between the last known actual availability and each synthetic availability model. Criteria for comparison may include statistical measures, error rates, similarity indices, or thresholds that determine which synthetic availability value is most aligned or accurate relative to the last known actual availability. Based on the comparison criteria, the system selects the synthetic availability value from the plurality of synthetic availabilities that best matches or correlates with the last known actual availability obtained from the digital log. The system may utilize the chosen synthetic availability value as a representation or estimation of the resource's availability for future planning, decision-making, or system operations. It may integrate this synthetic availability value into algorithms, monitoring systems, or resource allocation strategies within the computer network. The system may continuously refines or updates the synthetic availability selection process based on new actual availability data recorded in the digital log, improving the accuracy and reliability of synthetic availability estimations over time.

At step 406, process 400 (e.g., using one or more components described above) determine an aggregate availability for the first computer network based on the first synthetic availability and the first synthetic availability. For example, the system may determine a first aggregate availability for the first computer network based on the first actual availability and the first synthetic availability.

In some embodiments, determining the first aggregate availability for the first computer network based on the first actual availability and the first synthetic availability may comprise the system aggregating the first cryptographically secure digital asset and the second cryptographically secure digital asset and determining the first aggregate availability based on aggregating the first cryptographically secure digital asset and the second cryptographically secure digital asset. For example, the system may system gather or calculate the real-time or historical availability of resources using actual data obtained from monitoring systems or logs. The system may also determine a last known amount of availability at an off-line resource. Alternatively or additionally, the system may derive synthetic availability from predictive models, statistical analysis, and/or other algorithms that forecast or estimate resource availability based on historical patterns, trends, and/or predictive factors. The system may consider two cryptographically secure digital assets as indicators of availability. Each asset's value may represent the availability status or a weighted measure reflecting the degree of availability for the corresponding resource. For instance, the first asset's value might represent the actual percentage availability, while the second asset's value signifies a predicted or estimated availability measure. The system may combine or aggregate the values of the two assets (actual and synthetic) to determine the aggregate availability. The system may use mathematical operations (such as addition, averaging, weighted aggregation, or other algorithms) to combine these values and calculate an overall representation of aggregate availability. The system may use the significance or reliability attributed to each asset's availability representation. The system may apply different weights or proportions during aggregation to prioritize one token's influence over the other in determining the aggregate availability. Based on the calculated aggregate availability value, the system assesses whether the network's overall availability meets predefined thresholds, requirements, or criteria for optimal functioning or desired operational levels. If the aggregate availability meets desired criteria, the system may proceed with resource allocation, task execution, or decision-making based on the assessed availability. In case the aggregate availability falls below acceptable levels, the system may trigger contingency plans, alternative resource utilization, or alert mechanisms to mitigate potential risks or issues.

At step 408, process 400 (e.g., using one or more components described above) receive a request for an action. For example, the system may receive a first request to perform a first blockchain action across the first computer network. In some embodiments, the system may receive the first request to perform the first blockchain action across the first computer network may comprise a system determining that the first blockchain action requests access to the second resource and determining to use the first actual availability to process the first blockchain action.

For example, the process of receiving a request to perform a blockchain action across a computer network involves assessing the action's requirements, including access to resources, and making decisions based on the availability of those resources. The system may receive a request to execute a blockchain action across the computer network. This request may contain information about the action to be performed and the resources required for its execution. The system may examine the details of the blockchain action to identify the resources needed, including access to a second resource and potential dependencies on the availability of other resources. The system may assess the availability status of the required resources. The system may check the actual availability of the first resource (already known or retrievable from logs or real-time monitoring systems) that might be involved in processing the blockchain action. Upon evaluating the actual availability of the first resource, the system may make a determination whether to proceed with using this available resource to process the blockchain action that requests access to the second resource. If the system decides to use the actual availability of the first resource, the system may initiate the processing of the blockchain action, leveraging the available resource to fulfill the action's requirements. Throughout this process, the system maintains logs or records of resource availability, actions performed, decisions made based on resource availability, and the outcome of the blockchain action execution.

In case the first resource's availability changes or if there are unexpected issues during execution, the system may have predefined error-handling mechanisms or contingency plans to manage such situations. The system may continue to monitor for whether a resource is on-line or off-line. For example, the system may determine that the second resource is now on-line and replace, using a fourth self-executing program, the first synthetic availability with a second actual availability in the digital log. Additionally or alternatively, the system may determine that the first resource is now off-line and replace, using a fifth self-executing program, the first actual availability with a second synthetic availability in the digital log. Upon completion of the blockchain action or decision-making process based on resource availability, the system may provide feedback, update status, or generate reports to relevant stakeholders regarding the action's execution and resource utilization.

In some embodiments, determining to use the first actual availability to process the first blockchain action may comprise the system determining that the second resource is off-line and, in response to determining that the second resource is off-line, determining to use the first aggregate availability to process the first blockchain action. For example, when a system determines that a second resource required for a blockchain action is offline, it can respond by using an aggregate availability derived from multiple other resources to process the blockchain action. To do so, the system may continually monitor the status of various resources, including the second resource necessary for the blockchain action. This monitoring could involve real-time checks, periodic pings, or status updates from network nodes or monitoring systems. The system may detect or receive information indicating that the second resource required for the blockchain action is offline or unavailable. This could be due to maintenance, technical issues, a bank branch being closed (e.g., in a financial services embodiment), and/or other reasons causing the resource to be temporarily inaccessible. Upon detecting the offline status of the second resource, the system may initiate a process to calculate an aggregate availability value. This involves assessing the availability status of a plurality of other resources within the network. The system may compute or aggregate the availability metrics, status, or capabilities of multiple other resources that are online and accessible. It combines this information to derive an aggregate availability value that represents the combined availability of these resources. Using the calculated aggregate availability value, the system may determine whether it is feasible or appropriate to use this combined availability of other resources to process the first blockchain action, compensating for the unavailability of the second resource. If the system determines that the aggregate availability of other resources is sufficient or adequate to handle the blockchain action, the system proceeds to execute the action using the collective capabilities of the available resources. During the execution, the system may dynamically allocate or redistribute availability, liquidity, tasks, load, and/or responsibilities among the available resources to ensure efficient processing of the blockchain action. While the action is being processed using the aggregate availability, the system continues to monitor resource status. It reassesses the situation to determine when the initially offline resource is back online and whether to adjust resource allocation accordingly. Throughout this process, the system maintains logs, records the decision-making process, resource availability details, and action execution outcomes. It may also generate reports or notifications to stakeholders regarding resource utilization and actions taken.

At step 410, process 400 (e.g., using one or more components described above) process the action using the aggregate availability. For example, the system may process the first blockchain action using the first aggregate availability. In some embodiments, the system may process the first blockchain action using the first aggregate availability by determining a second aggregate availability for the first computer network following the first blockchain action and determining, using a third self-executing program, a second synthetic availability for the second resource following the first blockchain action. For example, following a blockchain action the system may continuously monitor actual and synthetic availability, updates availability values for as needed, recalculate aggregate availability, and/or adjusts resource allocation or decision-making accordingly.

In some embodiments, processing the first blockchain action using the first aggregate availability may comprise the system determining an amount of availability needed to process the first blockchain action. The system may then use the first actual availability to process the first blockchain action. The system may then deduct the amount from the first synthetic availability to determine a second synthetic availability for the second resource. The system may then determine a third synthetic availability for the first resource corresponding to the amount. For example, system may evaluate the first blockchain action's requirements and determines the amount of availability needed from the resources involved in the action. The system may check the first actual availability, which represents the real-time availability status of the resources involved. It uses this actual availability to process the first blockchain action. After using the actual availability to process the action, the system deducts the amount of availability consumed or utilized from the first synthetic availability corresponding to the resource involved in the action. This deduction adjusts the synthetic availability value to reflect the portion of resources utilized for processing the first blockchain action. The system may recalculate or determine a third synthetic availability value specifically for the first resource based on the amount of availability consumed during the processing of the first blockchain action. This third synthetic availability represents the adjusted availability estimation for the first resource after accounting for the utilization in the processing of the action.

In some embodiments, the system may determine the first actual availability for the first resource in the first computer network by the system receiving a first verification that the first resource has the first actual availability and recording the first cryptographically secure digital asset as corresponding to the first resource based on the first verification. For example, the system may initiate a verification process to determine the actual availability of a specific resource (e.g., a balance in a bank account, liquidity in a bank branch, etc.) within the computer network. This verification can involve various methods, such as network monitoring, pinging the resource, querying its status, or using specific protocols to confirm its accessibility. Upon verification, the system receives a confirmation or verification signal indicating the current status or availability level of the resource. This signal signifies that the resource is accessible and operational at that particular moment, confirming its actual availability. Following the verification and confirmation of the resource's availability, the system records or associates this verified status with a cryptographically secure digital asset. This association establishes a link or correlation between the verified actual availability of the resource and a unique digital asset stored or represented on the network. The system ensures that the digital asset linked to the resource's availability is cryptographically secure. This involves employing encryption, hashing, or other cryptographic techniques to safeguard the asset's integrity and authenticity within the system. The system maintains a record or ledger where the association between the verified actual availability and the corresponding cryptographically secure digital asset is stored securely. This record serves as a reference point for the resource's status and can be accessed for verification or auditing purposes. As the availability status of the resource changes over time (due to network conditions, maintenance, transactions, liquidity changes, etc.), the system may dynamically update or revise the association with the corresponding digital asset to reflect the most current and verified availability status accurately.

In some embodiments, the first verification may be determined based on an amount for an off-chain record corresponding to the first resource, and the first verification may be received at a first blockchain network via a first oracle. For example, the system may interact with an oracle that has access to off-chain data, such as databases, APIs, or external systems, where the off-chain record corresponding to a specific resource is stored or updated. The system may define conditions or rules specifying that an on-chain action should occur based on certain parameters or data retrieved from the off-chain record. For instance, the condition could be a specific amount or value associated with the resource in the off-chain record. The system may use the oracle to query the off-chain data source and retrieve the relevant information or amount corresponding to the resource. The oracle fetches this data from the off-chain record. Upon receiving the data from the off-chain source, the system may validate and compare it against the predefined conditions or rules set for triggering the on-chain action. If the retrieved amount matches or meets the specified criteria, the validation process confirms that the condition is satisfied. Once the validation confirms that the condition based on the off-chain record's data is met (e.g., a party delivers a good at issue in a transaction, a party paid for a good, a network connection is created, appropriate availability/liquidity is found, etc.), the system triggers the corresponding on-chain action or smart contract function. This action could involve initiating a transaction, updating a smart contract state, executing a programmatic function, or performing any predefined action on the blockchain. The verified on-chain action is broadcasted to the blockchain network for execution and inclusion in a block. Miners or validators on the blockchain network process and validate the transaction, ensuring its inclusion in the distributed ledger. After the transaction is confirmed and added to the blockchain, the on-chain action corresponding to the validated off-chain data is executed, thereby reflecting the updated state or result on the blockchain.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for managing resources across global or cloud networks while mitigating issues related to providing services while resources are off-line.
2. The method of the preceding embodiment, further comprising: determining, using a first self-executing program, a first actual availability for a first resource in a first computer network, wherein the first resource is currently on-line, and wherein the first actual availability is represented by a first cryptographically secure digital asset in a digital log; determining, using a second self-executing program, a first synthetic availability for a second resource in the first computer network, wherein the second resource is currently off-line, and wherein the first synthetic availability is represented by a second cryptographically secure digital asset in a digital log; determining a first aggregate availability for the first computer network based on the first actual availability and the first synthetic availability; receiving a first request to perform a first blockchain action across the first computer network; and processing the first blockchain action using the first aggregate availability.
3. The method of any one the preceding embodiments, wherein determining the first synthetic availability for the second resource in the first computer network further comprises: retrieving a last known actual availability for the second resource from the digital log; and selecting the first synthetic availability from a plurality of synthetic availabilities, based on the last known actual availability.
4. The method of any one the preceding embodiments, wherein receiving the first request to perform the first blockchain action across the first computer network further comprises: determining that the first blockchain action requests access to the second resource; and determining to use the first actual availability to process the first blockchain action.
5. The method of any one the preceding embodiments, wherein determining to use the first actual availability to process the first blockchain action further comprises: determining that the second resource is off-line; and in response to determining that the second resource is off-line, determining to use the first aggregate availability to process the first blockchain action.
6. The method of any one the preceding embodiments, wherein determining the first aggregate availability for the first computer network based on the first actual availability and the first synthetic availability further comprise: aggregating the first cryptographically secure digital asset and the second cryptographically secure digital asset; and determining the first aggregate availability based on aggregating the first cryptographically secure digital asset and the second cryptographically secure digital asset.
7. The method of any one the preceding embodiments, wherein processing the first blockchain action using the first aggregate availability further comprises: determining a second aggregate availability for the first computer network following the first blockchain action; and determining, using a third self-executing program, a second synthetic availability for the second resource following the first blockchain action.
8. The method of any one the preceding embodiments, wherein processing the first blockchain action using the first aggregate availability further comprises: determining an amount of availability needed to process the first blockchain action; using the first actual availability to process the first blockchain action; deducting the amount from the first synthetic availability to determine a second synthetic availability for the second resource; and determining a third synthetic availability for the first resource corresponding to the amount.
9. The method of any one the preceding embodiments, further comprising: determining that the second resource is now on-line; and replacing, using a fourth self-executing program, the first synthetic availability with a second actual availability in the digital log.
10. The method of any one the preceding embodiments, further comprising: determining that the first resource is now off-line; and replacing, using a fifth self-executing program, the first actual availability with a second synthetic availability in the digital log.
11. The method of any one the preceding embodiments, further comprising: determining a first characteristic of the first actual availability; and selecting the first cryptographically secure digital asset, from a plurality of cryptographically secure digital assets, based on the first characteristic.
12. The method of any one the preceding embodiments, wherein determining the first actual availability for the first resource in the first computer network further comprises: receiving a first verification that the first resource has the first actual availability; and recording the first cryptographically secure digital asset as corresponding to the first resource based on the first verification.
13. The method of any one the preceding embodiments, wherein the first verification is determined based on an amount for an off-chain record corresponding to the first resource, and wherein the first verification is received at a first blockchain network via a first oracle.
14. The method of any one the preceding embodiments, wherein receiving the first request further comprises: receiving, at a platform management application, a user request to perform a first off-chain action; and determining that the first blockchain action corresponds to first off-chain action.
15. The method of any one the preceding embodiments, wherein receiving the first request further comprises: receiving a first user request to perform a first off-chain action; and determining that the first blockchain action corresponds to the second resource.
16. A tangible, non-transitory, machine-readable medium storing instructions that, when executed by a data processing apparatus, cause the data processing apparatus to perform operations comprising those of any of embodiments 1-15.
17. A system comprising one or more processors; and memory storing instructions that, when executed by the processors, cause the processors to effectuate operations comprising those of any of embodiments 1-15.
18. A system comprising means for performing any of embodiments 1-15.

What is claimed is:

1. A method for managing resources across global or cloud networks while mitigating issues related to providing services while resources are off-line, the method comprising:
   determining, using a first self-executing program, a first actual availability for a first resource in a first computer network, wherein the first resource is currently on-line, and wherein the first actual availability is represented by a first cryptographically secure digital asset in a digital log;
   determining, using a second self-executing program, a first synthetic availability for a second resource in the first computer network, wherein the second resource is currently off-line, and wherein the first synthetic availability is represented by a second cryptographically secure digital asset in a digital log;
determining a first aggregate availability for the first computer network based on the first actual availability and the first synthetic availability;
receiving a first request to perform a first blockchain action across the first computer network; and
processing the first blockchain action using the first aggregate availability.

2. The method of claim 1, wherein receiving the first request to perform the first blockchain action across the first computer network further comprises:
determining that the first blockchain action requests access to the second resource; and
determining to use the first actual availability to process the first blockchain action.

3. The method of claim 2, wherein determining to use the first actual availability to process the first blockchain action further comprises:
determining that the second resource is off-line; and
in response to determining that the second resource is off-line, determining to use the first aggregate availability to process the first blockchain action.

4. The method of claim 1, wherein determining the first actual availability for the first resource in the first computer network further comprises:
receiving a first verification that the first resource has the first actual availability; and
recording the first cryptographically secure digital asset as corresponding to the first resource based on the first verification.

5. The method of claim 4, wherein the first verification is determined based on an amount for an off-chain record corresponding to the first resource, and wherein the first verification is received at a first blockchain network via a first oracle.

6. The method of claim 1, wherein determining the first synthetic availability for the second resource in the first computer network further comprises:
retrieving a last known actual availability for the second resource from the digital log; and
selecting the first synthetic availability from a plurality of synthetic availabilities, based on the last known actual availability.

7. The method of claim 1, wherein determining the first aggregate availability for the first computer network based on the first actual availability and the first synthetic availability further comprise:
aggregating the first cryptographically secure digital asset and the second cryptographically secure digital asset; and
determining the first aggregate availability based on aggregating the first cryptographically secure digital asset and the second cryptographically secure digital asset.

8. The method of claim 1, wherein processing the first blockchain action using the first aggregate availability further comprises:
determining a second aggregate availability for the first computer network following the first blockchain action; and
determining, using a third self-executing program, a second synthetic availability for the second resource following the first blockchain action.

9. The method of claim 1, wherein processing the first blockchain action using the first aggregate availability further comprises:
determining an amount of availability needed to process the first blockchain action;
using the first actual availability to process the first blockchain action;
deducting the amount from the first synthetic availability to determine a second synthetic availability for the second resource; and
determining a third synthetic availability for the first resource corresponding to the amount.

10. The method of claim 1, further comprising:
determining that the second resource is now on-line; and
replacing, using a fourth self-executing program, the first synthetic availability with a second actual availability in the digital log.

11. The method of claim 1, further comprising:
determining that the first resource is now off-line; and
replacing, using a fifth self-executing program, the first actual availability with a second synthetic availability in the digital log.

12. The method of claim 1, further comprising:
determining a first characteristic of the first actual availability; and
selecting the first cryptographically secure digital asset, from a plurality of cryptographically secure digital assets, based on the first characteristic.

13. The method of claim 1, wherein receiving the first request further comprises:
receiving, at a platform management application, a user request to perform a first off-chain action; and
determining that the first blockchain action corresponds to first off-chain action.

14. The method of claim 1, wherein receiving the first request further comprises:
receiving a first user request to perform a first off-chain action; and
determining that the first blockchain action corresponds to the second resource.

15. One or more non-transitory, computer-readable mediums comprising instructions recorded thereon that when executed by one or more processors cause operations comprising:
determining, using a first self-executing program, a first actual availability for a first resource in a first computer network, wherein the first resource is currently on-line, and wherein the first actual availability is represented by a first cryptographically secure digital asset in a digital log;
determining, using a second self-executing program, a first synthetic availability for a second resource in the first computer network, wherein the second resource is currently off-line, and wherein the first synthetic availability is represented by a second cryptographically secure digital asset in a digital log;
determining a first aggregate availability for the first computer network based on the first actual availability and the first synthetic availability;
receiving a first request to perform a first blockchain action across the first computer network; and
processing the first blockchain action using the first aggregate availability.

16. The one or more non-transitory, computer-readable mediums of claim 15, wherein receiving the first request to perform the first blockchain action across the first computer network further comprises:

determining that the first blockchain action requests access to the second resource; and determining to use the first actual availability to process the first blockchain action.

17. The one or more non-transitory, computer-readable mediums of claim 16, wherein determining to use the first actual availability to process the first blockchain action further comprises:

determining that the second resource is off-line; and in response to determining that the second resource is off-line, determining to use the first aggregate availability to process the first blockchain action.

18. The one or more non-transitory, computer-readable mediums of claim 15, wherein determining the first synthetic availability for the second resource in the first computer network further comprises:

retrieving a last known actual availability for the second resource from the digital log; and selecting the first synthetic availability from a plurality of synthetic availabilities, based on the last known actual availability.

19. The one or more non-transitory, computer-readable mediums of claim 15, wherein determining the first aggregate availability for the first computer network based on the first synthetic availability and the first synthetic availability further comprise:

aggregating the first cryptographically secure digital asset and the second cryptographically secure digital asset; and determining the first aggregate availability based on aggregating the first cryptographically secure digital asset and the second cryptographically secure digital asset.

20. A system for managing resources across global or cloud networks while mitigating issues related to providing services while resources are off-line, the system comprising:

one or more processors; and one or more non-transitory, computer-readable mediums comprising instructions recorded thereon that when executed by the one or more processors cause operations comprising:

determining, using a first self-executing program, a first actual availability for a first resource in a first computer network, wherein the first resource is currently on-line, and wherein the first actual availability is represented by a first cryptographically secure digital asset in a digital log;

determining, using a second self-executing program, a first synthetic availability for a second resource in the first computer network, wherein the second resource is currently off-line, and wherein the first synthetic availability is represented by a second cryptographically secure digital asset in the digital log;

determining a first aggregate availability in the digital log for the first computer network based on the first cryptographically secure digital asset and the second cryptographically secure digital asset;

receiving a first request to perform a first blockchain action, wherein the first blockchain action requests access to the second resource;

processing the first blockchain action using the first aggregate availability;

determining a second aggregate availability for the first computer network following the first blockchain action;

determining, using a third self-executing program, a second synthetic availability for the second resource following the first blockchain action;

determining that the second resource is now on-line; and replacing, using a fourth self-executing program, the second synthetic availability with second actual availability in the digital log.

\* \* \* \* \*